(12) United States Patent
Bauer et al.

(10) Patent No.: US 7,036,837 B1
(45) Date of Patent: May 2, 2006

(54) MOTORCYCLE REAR FRAME MOUNTING SYSTEM

(75) Inventors: Kathy J Bauer, Dousman, WI (US); Gary C. Gray, Luck, WI (US); Jeffrey P. Wolf, Osceola, WI (US); Jason W.B. Hoeve, Forest Lake, MN (US); Michael M. Song, Maple Grove, MN (US)

(73) Assignee: Polaris Industries, Inc., Medina, MN (US)

( * ) Notice: Subject to any disclaimer, the term of this patent is extended or adjusted under 35 U.S.C. 154(b) by 0 days.

(21) Appl. No.: 10/686,007

(22) Filed: Oct. 15, 2003

Related U.S. Application Data

(63) Continuation of application No. 10/612,279, filed on Jul. 1, 2003, now abandoned.

(51) Int. Cl.
*B62D 61/02* (2006.01)
*B62J 7/04* (2006.01)

(52) U.S. Cl. .................. 280/288.4; 180/219; 224/413; 224/423; 224/430; 293/105

(58) Field of Classification Search ............... 280/204, 280/292, 202, 288.4, 291, 304.3, 160.1, 852; 180/219; 224/423, 429, 430, 436, 440, 413; 293/105, 106
See application file for complete search history.

(56) References Cited

U.S. PATENT DOCUMENTS

| | | | |
|---|---|---|---|
| 3,927,727 A | 12/1975 | Hanagan | 180/30 |
| 4,170,272 A | 10/1979 | Smolinski | 180/227 |
| 4,712,637 A | 12/1987 | Mogi et al. | 180/219 |
| 4,993,731 A | 2/1991 | Fuller | 280/202 |
| 5,299,832 A | 4/1994 | Price, Sr. | 280/854 |
| 6,073,948 A | 6/2000 | Motojima et al. | 280/152.2 |
| 6,234,266 B1 * | 5/2001 | Saiki | 180/219 |
| 6,273,207 B1 | 8/2001 | Brown | 180/219 |
| 6,318,743 B1 | 11/2001 | Nakashima et al. | 280/152.1 |
| 6,349,783 B1 | 2/2002 | Galbraith et al. | 180/219 |
| 6,520,275 B1 * | 2/2003 | Galbraith et al. | 180/219 |
| 2002/0096859 A1 * | 7/2002 | Versaw | 280/511 |

* cited by examiner

*Primary Examiner*—Anne Marie Boehler
(74) *Attorney, Agent, or Firm*—Baker & Daniels LLP

(57) ABSTRACT

The invention provides a method and apparatus utilized to mount a motorcycle fender, as well as one or more components, directly to an upper rear portion of a motorcycle frame. The upper rear portion of the frame includes one or more rear frame rails, each having a plurality of holes defined therein. These holes are further used in securing the fender and the one or more components.

18 Claims, 7 Drawing Sheets

MOTORCYCLE REAR FRAME MOUNTING SYSTEM

This application is a continuation of U.S. application Ser. No. 10/612,279, filed Jul. 1, 2003, now abandoned.

TECHNICAL FIELD

The invention relates to a system for mounting items onto a vehicle, and in particular, for mounting a fender and one or more components onto a frame of a motorcycle.

BACKGROUND OF THE INVENTION

There are a number of existing ways to support a motorcycle rear fender. One well-known technique involves attaching struts to a rear axle of the motorcycle, including the well-known "sissy" bar, for supporting the fender. Other well-known techniques involve attaching supports to a portion of a motorcycle other than the axle. Generally, these other well-know techniques comprise either welding a support directly to the frame or drilling holes into the frame and then bolting the support directly to the frame. Although welding and bolting to the frame will provide strong support for the fender, the strength of such fastening systems is not the only consideration. The integrity of the frame and the overall appearance of the motorcycle with the support are also important considerations. In order to understand why, one must appreciate that motorcycles are not simply a form of transportation or a vehicle for recreational use. To afficionados and collectors, some motorcycles have intrinsic value over and above their vehicular uses. By welding or bolting something foreign onto the frame, the overall look and resale value of the motorcycle may be greatly reduced in the eyes of these afficionados and collectors.

This same reasoning generally holds true in regard to the mounting of components on the motorcycle, and providing support for the components. While it may be perfectly reasonable to weld or bolt additional supporting brackets to the frame for support for these components, the modification may very well compromise the motorcycle's look and resale value as well. Further, if the components are removable, once they are removed, one may be left with support brackets or mounting holes not being utilized, which would likely compromise the sleekness of the motorcycle design. Another problem in regard to the support brackets and the components attached thereon is that, even if the components are removable, the components are generally not easily removable from the support brackets of the motorcycle.

SUMMARY OF THE INVENTION

According to a first aspect of the invention, there is provided a motorcycle. The motorcycle comprises a frame, a front wheel, a rear wheel, a rear fender, and one or more components. The front wheel is operatively coupled to a front portion of the frame, and the rear wheel is operatively coupled to a lower rear portion of the frame. The rear fender is directly coupled to an upper rear portion of the frame, and the one or more components are directly coupled to the upper rear portion of the frame.

According to a second aspect of the invention, there is provided a motorcycle. The motorcycle comprises a frame and a rear fender. The frame has a front and rear portion, in which the rear portion includes an upper portion and a lower portion. The upper rear portion includes one or more rear frame rails, with each rail having a plurality of holes located therein. The rear fender is directly coupled to the upper rear portion of the frame and includes a plurality of bores located therein. Each of the plurality of bores is configured to align with one of the plurality of holes in one of the rear frame rails.

According to a third aspect of the invention, there is provided a method of mounting a rear fender to a motorcycle frame while keeping the mounting hardware concealed but readily accessible. The method involves removing a first rear fender and any mounting hardware from an upper rear portion of the motorcycle frame. Two holes are drilled into the upper rear portion of the motorcycle frame. Two bores are drilled into a second rear fender to align with the two holes in the upper rear portion of the motorcycle frame. The second rear fender is secured to the upper rear portion of the motorcycle frame, and at least one cover adapted to conceal one or more of the bores in the second rear fender is provided. At least one aperture is drilled into the at least one cover to align with one of the bores in the second rear fender and one of the one of the holes in the upper rear portion of the motorcycle frame. The at least one cover is secured to the upper rear portion of the motorcycle frame.

DETAILED DESCRIPTION OF PREFERRED EMBODIMENTS OF THE INVENTION

Figure 1:
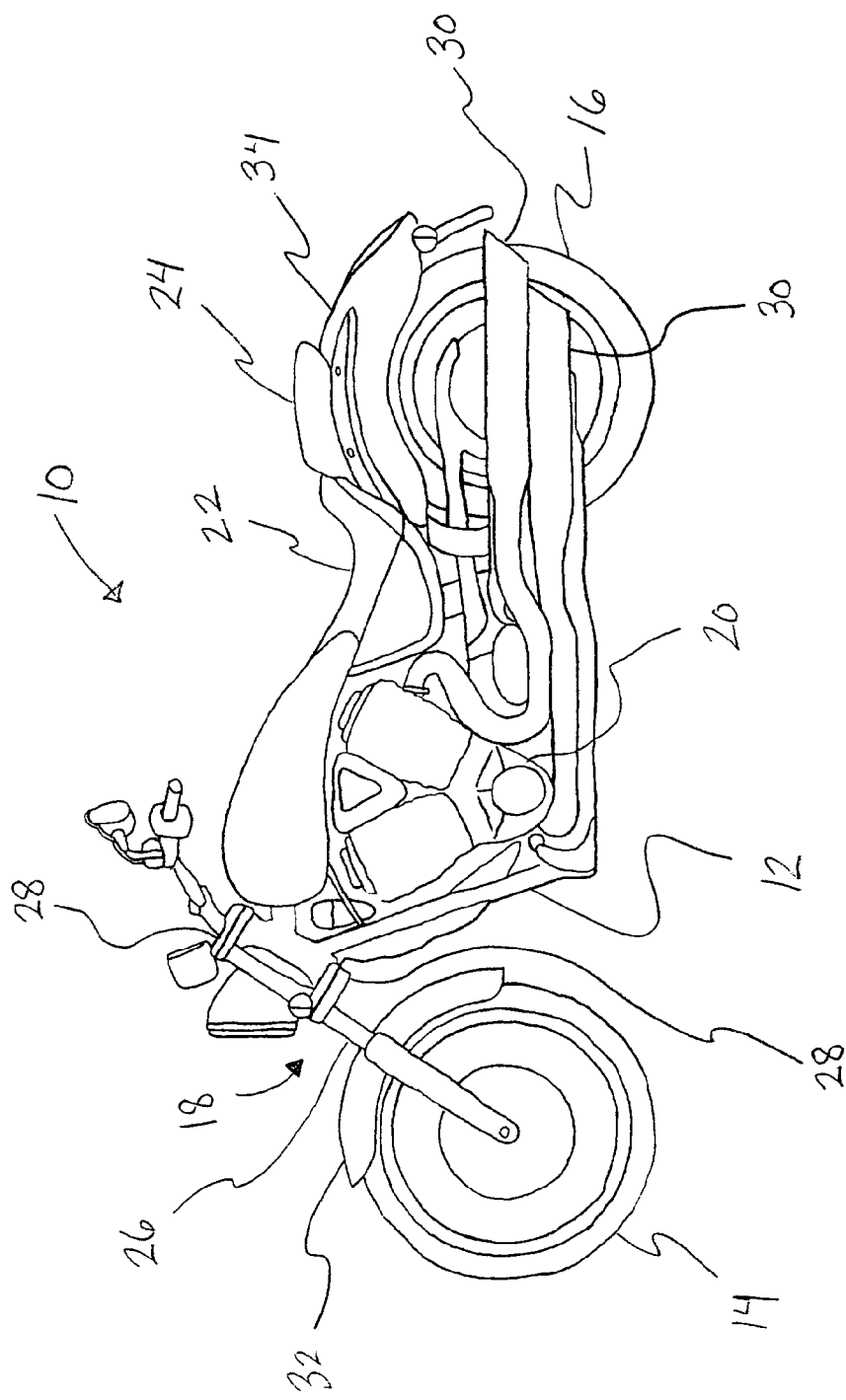
FIG. 1 is a schematic side view of a motorcycle in accordance with certain embodiments of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The mounting system of the invention is designed for use on vehicles such as motorcycles, however, it may be applied to other vehicles such as mopeds, scooters, bicycles, all-terrain vehicles, and the like.

FIG. 1 illustrates a side view of a motorcycle 10 in accordance with certain embodiments of the invention. The motorcycle 10 includes a frame 12, a front wheel 14, a rear wheel 16, a steering fork 18, an engine 20, a driver seat 22, and a passenger seat 24. The front wheel 14 is operatively coupled to a front portion of the frame 12 via a pair of fork tubes 26 (only one of which is visible in FIG. 1) and a pair of triple clamps 28. The rear wheel 16 is operatively coupled to a lower rear portion of the frame 12 via a pair of swingarms (both the lower rear frame portion and the swingarms are concealed behind the motorcycle tailpipes 30 and not visible in FIG. 1). The motorcycle 10 further includes a front fender 32 and a rear fender 34. The rear fender 34 is coupled to an upper rear portion of the frame 12 (concealed beneath the fender 34 and not visible in FIG. 1). Additionally, one or more components are coupled to the upper rear portion of the frame 12. Each component generally comprises an accessory to the motorcycle 10. An example is the shown rear passenger seat 24. However, as will be detailed below, the component should not be limited as such. For example, the component could just as well comprise another accessory such as a luggage rack, a smuggler, a pair of saddlebags, a driver backrest, a passenger backrest, or the like.

Figure 2:
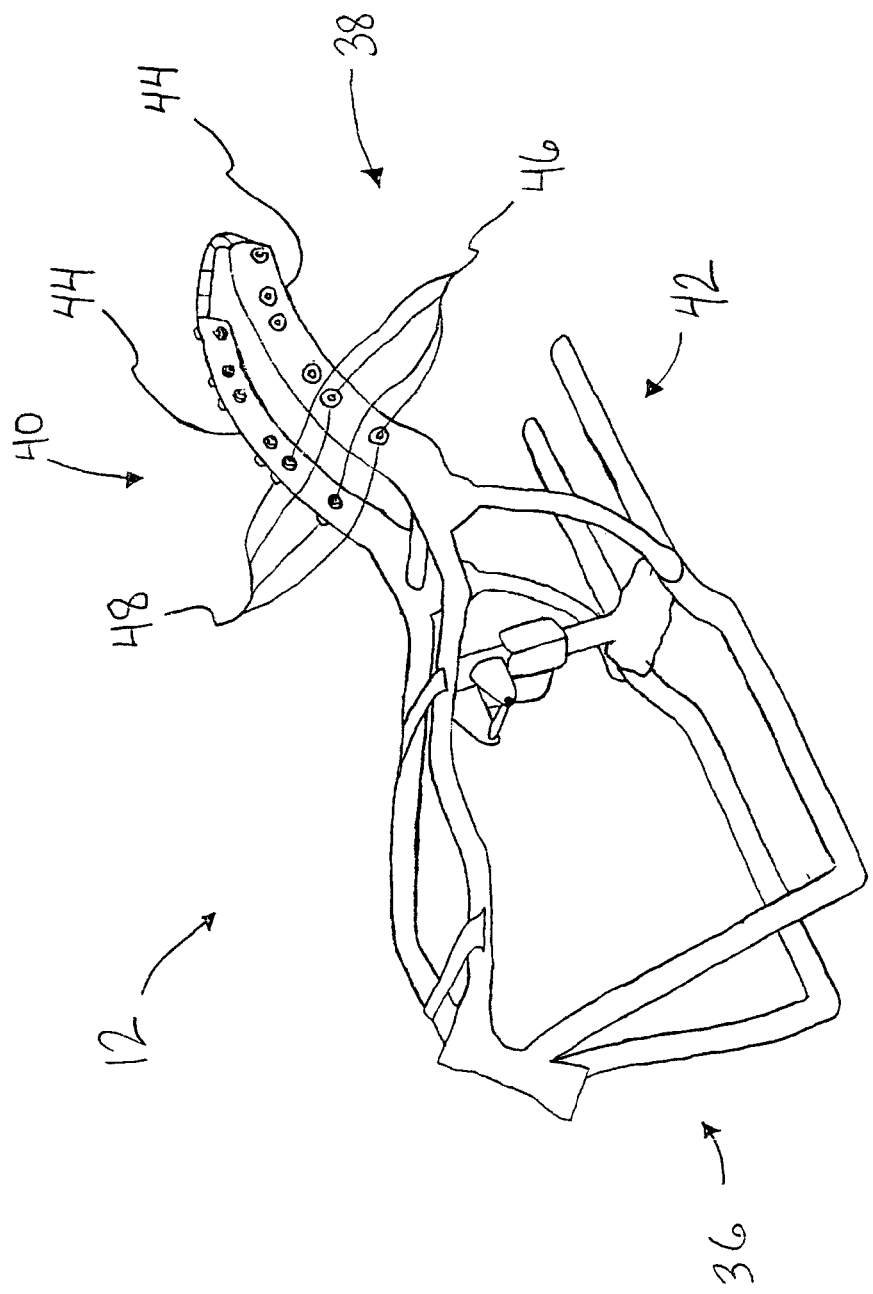
FIG. 2 is a schematic, side perspective view of a frame of the motorcycle of FIG. 1.

FIG. 2 shows a schematic, side perspective view of the frame of the motorcycle 10 of FIG. 1. The front and rear frame portions mentioned above are referenced as 36 and 38 respectively, as are the upper and lower portions 40, 42 of the rear frame portion 38. The upper rear portion 40 includes one or more rear frame rails 44, each with a plurality of holes 46 defined therein. As shown, the spacing between the plurality of holes 46 in each of the rear frame rails 44 is not uniform, however, embodiments may exist in which the spacing of such holes 46 is uniform. As also shown, one preferable embodiment provides an upper rear frame portion 40 having two rear frame rails 44, each with six holes 46 defined therein. While this embodiment displays a preferable number of rear frame rails 44 and a preferable number of holes 46 per frame rail 44, it is contemplated that other embodiments may involve the frame 12 having a larger or smaller quantity of frame rails 44, each having a plurality of holes 46 distinct from what is described herein. It is to be appreciated that the number of rails 44 and number of holes 46 per rail 44 detailed herein are exemplary, and numerically defining them herein is not done so with intent to limit the invention as such. In preferable embodiments, each of the holes 46 defined in the rear frame rails 44 also has inner threading to enable the securement of threaded fasteners therein.

In preferable embodiments, a portion 48 of the rear frame rail 44 that forms the outer perimeter of each hole 46 extends axially outward a certain distance from the rail 44. This axial extension of the rear frame rail 44 surrounding each hole 46 allows for contact to be made only between the rear frame rail 44 and the item being secured to it. As described above, the holes 46 in the rear frame rails 44 will be utilized to receive fasteners 58 (shown in FIG. 3). As such, the fasteners 58 will be used to secure a plurality of items (e.g., the rear fender 34, one or more components, etc.) which when mounted, will overlay one another. Because of this overlaying of the items, there is a general concern regarding contact between the items that could lead to scratching or blemishing the surfaces of the items thereof. With the axial extension of the rear frame rail 44 surrounding each hole 46, such contact between overlayed items is avoided, as will be further detailed below.

Figure 3:
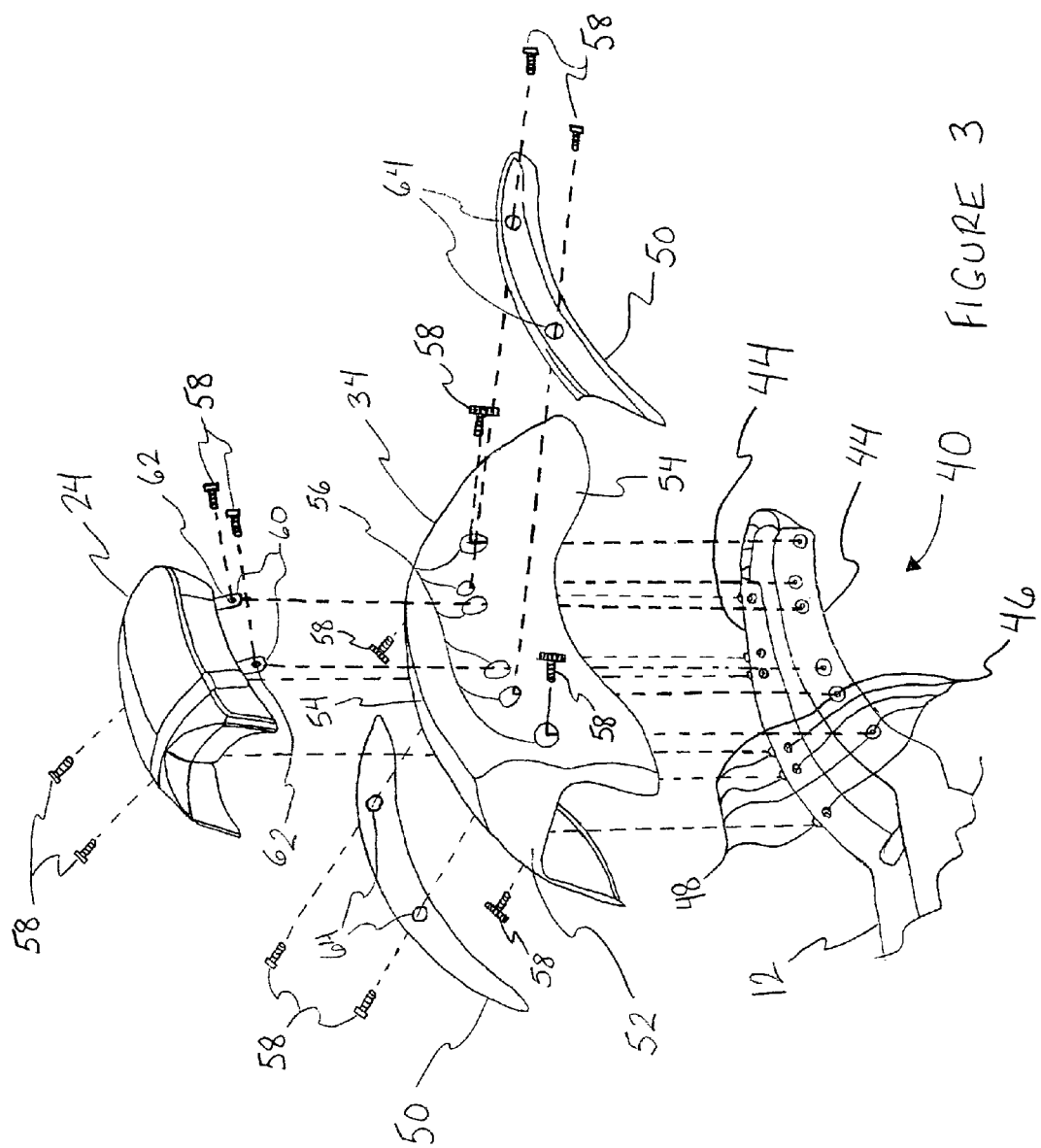
FIG. 3 is a schematic, exploded side perspective view of an upper rear portion of the motorcycle of FIG. 1.

FIG. 3 illustrates a schematic, exploded side perspective view of the upper rear portion of the motorcycle 10 of FIG. 1. The exploded view displays the assembly of the rear fender 34, one component (shown as the rear passenger seat 24), and a pair of covers 50 to the rear frame rails 44 of the upper rear portion 40 of the motorcycle frame 12. Preferably, the assembly is broken down into three different sub-assemblies. The rear fender 34 is mounted initially over the rear frame rails 44. Next, the component (the rear passenger seat 24) is mounted over the rear frame rails 44, with the fender 34 being located therebetween. Finally, each of the pair of covers 50 is mounted over one of the corresponding rear frame rails 44, with the mounting hardware for the fender 34 and the component being located and concealed therebetween. It is contemplated that embodiments may exist in which no components are mounted to the rear frame rails 44. As such, the assembly would generally involve two different sub-assemblies, one involving the rear fender 34 being secured to the rear frame rails 44, and another involving the covers 50 being secured to the rear frame rails 44.

In preferable embodiments, the rear fender 34 has a front wall 52 and a pair of side walls 54. Each side wall 54 has a plurality of bores 56 defined therein (only one set of bores 56 is visible in the side perspective view of FIG. 3). Preferably, each of the bores 56 on the side walls 54 is configured to align with one of the corresponding holes 46 in each of the rear frame rails 44, as represented in FIG. 3 with vertical dashed lines. As such, the quantity of bores 56 defined by the rear fender 34 preferably corresponds to the number of holes 46 defined by the rear frame rails 44. Thus, as described above, if there is a quantity of six holes 46 in each of the rear frame rails 44, there will preferably be a corresponding quantity of six bores 56 in each side wall 54 of the rear fender 34.

The rear fender 34 is positioned so that the rear frame rails 44 are located posterior to the fender 34 and the bores 56 align with the holes 46. The rear fender 34 is secured to the rear frame rails 44 using one or more fasteners 58. The one or more fasteners 58 are each adapted to extend through one of the bores 56 in the rear fender 34 and be threadably received in one of the aligned holes 46 in one of the frame rails 44. As shown, in one embodiment, a total of four fasteners 58, two fasteners 58 extending through each side wall 54 and corresponding frame rail 44, are utilized to secure the rear fender 34 to the rear frame rails 44. Preferably, the fasteners 58 utilized to secure the fender 34 extend through the outermost bores 56 on each fender side wall 54, and are received in the corresponding outermost holes 46 in each of the rear frame rails 44.

It should be appreciated that the plurality of bores 56 in each fender side wall 54 may alternatively be less than or greater in quantity than the number of holes 46 in each of the rear frame rails 44. While the number of bores 56 in each fender side wall 54 is described above to be the same as the number of holes 46 in each frame rail 44 herein, it is not done so with intent to limit the invention as such. Additionally, while four fasteners 58 are detailed to secure the rear fender 34 to the rear frame rails 44, it is contemplated that other embodiments may exist where fewer or more than four fasteners 58 may be used to support the fender 34. Further, it should be appreciated that the fasteners 58 used to secure the fender 34 to the rear frame rails 44 may extend through any of the bores 56 in the fender 34 and any of the holes 46 in the rear frames 44, and should not be limited to just the outermost bores 56 and holes 46. Finally, the fasteners 58 used to secure the fender 34 to the rear frame rails 44 are preferably a different fastener size and have a different head size than other fasteners 58 used to secure the one or more components or the pair of covers 50. As such, when the operator is changing the one or more components, it would be clear which fasteners 58 are used to remove the one or more components and which fasteners 58 are used to remove the fender 34.

As described above, the component is generally an accessory to the motorcycle 10. Preferably, the component includes the accessory as well as an attached mounting bracket (shown, but largely concealed by the passenger seat 24 in FIG. 3), however, it is appreciated that other components may have the mounting bracket integrally formed to the accessory. Whether attached or formed to the accessory, the mounting bracket preferably includes portions 60 that protrude away from the accessory (only two such portions 60 are visible in FIG. 3). Preferably, each of these protruding bracket portions 60 defines an aperture 62. Each of the apertures 62 is generally configured to align with one of the bores 56 in the rear fender 34 that is aligned with one of the holes 46 in one of the rear frame rails 44, as represented in FIG. 3 with the vertical dashed lines. Preferably, the rear frame rail portions 48 representing the perimeters of each of these utilized holes 46 extend axially outward a certain distance from each rail 44. These axially-extending rear frame rail portions 48, surrounding each of the holes 46 utilized in securing the component, are of a sufficient length such that the portions extend through the corresponding bores 56 in the rear fender 34 and an appropriate length axially away from the fender 34 such that the one or more components only contact the rear frame rails 44 and not the fender 34.

The component is positioned so that the rear fender 34 and the frame rails 44 are located posterior to the component, and the apertures 62 align with the bores 56 and holes 46 respectively. The component is secured to the rear frame rails 44 using one or more fasteners 58. The one or more fasteners 58 are each adapted to initially extend through one of the apertures 62 in each support bracket portion 60, to further extend through one of the bores 56 in the rear fender 34, and to finally be threadably received in a corresponding aligned hole 46 in one of the frame rails 44. In one embodiment, a total of four fasteners 58, one fastener 58 for each support bracket portion 60 (only two are visible in FIG. 3), are utilized to secure the component to the rear frame rails 44. Preferably, the fasteners 58 utilized to secure the component extend through the innermost bores 56 in the fender 34 and are threadably received in the corresponding innermost holes 46 in each of the rear frames 44.

It should be appreciated that while four fasteners 58 are detailed to secure the component to the rear frame rails 44, other embodiments may exist where fewer or more than four fasteners 58 may be used to secure the component. Additionally, it is contemplated that the fasteners 58 used to secure the fender 34 to the rear frame rails 44 may extend through any of the bores 56 in the fender 34 and aligned holes 46 in the rear frames 44, and should not be limited to just the innermost bores 56 and corresponding aligned holes 46. Further, while only one component is described above and shown as being mounted to the rear frame rails 44, it is contemplated that more than one component may be mounted as well. While there may be limitations to component quantity if the components are positioned in the same proximity of the motorcycle (i.e., rear passenger seat, luggage rack, smuggler, etc.), if the components, when mounted, do not take up the same area on the motorcycle, it is possible to mount more than one component onto the rear frame rails 44. If an appropriate quantity of bores 56 were unused or added to the rear fender 34 and a corresponding quantity of holes 46 were unused or added to the rails 44 and aligned with these bores 56, fasteners 58 could be used with these bores 56 and holes 46 to secure additional components following the same general procedures as described above. Alternatively, the same bores 56 and aligned holes 46 could be utilized to support more than one of the components. Finally, as described above, the fasteners 58 used to secure the one or more components to the rear frame rails 44 are preferably a different fastener size and have a different head size than fasteners 58 used to secure the rear fender 34. As such, when the operator is changing the one or more components, it would be clear which fasteners 58 are used to remove the one or more components and which fasteners 58 are used to remove the fender 34.

In preferable embodiments, each of the covers 50 is chrome or chrome-plated. Each of the covers 50 is utilized to cover the bores 56 in each rear fender sidewall 54 as well as to conceal the mounting hardware (i.e., fasteners 58) used in securing both the rear fender 34 and the one or more components to the rear frame rails 44. Each cover 50 has one or more openings 64 defined therein. Preferably, each of the openings 64 on each cover 50 is configured to align with one of the holes 46 in the rear fender side walls 54 (represented by the horizontal dashed lines), as well as corresponding aligned holes 56 in the frame rails 44 (represented by the vertical dashed lines). Preferably, the rear frame rail portions 48 representing the perimeters of each of these utilized holes 46 extend axially outward a certain distance from each rail 44. These axially-extending rear frame rail portions 48, surrounding each of the holes 46 utilized in securing the covers 50, are of a sufficient length such that the portions extend through the corresponding bores 56 in the rear fender 34 and an appropriate length axially away from the fender 34 such that the covers 50 only contact the rear frame rails 44 and not the fender 34.

Each of the covers 50 is positioned so that the frame rails 44, the rear fender 34, the mounting bracket portions 60, and corresponding fasteners 58 for the fender 34 and the one or more components are located posterior to the covers 50. Additionally, the openings 64 are aligned with corresponding bores 56 and holes 46 respectively. Each cover 50 is secured to the rear frame rails 44 using one or more fasteners 58. The one or more fasteners 58 are each adapted to initially extend through one of the openings 64 in each cover 50, to further extend through one of the bores 56 in the rear fender 34, and to finally be threadably received in a corresponding aligned hole 46 in one of the frame rails 44. In one embodiment, a quantity of two fasteners 58 is utilized to secure each of the covers 50 to one of the rear frame rails 44. The fasteners 58 utilized to secure the covers 50 extend through the unused bores 56 in the fender 34 and are threadably received in the corresponding unused holes 46 in each of the rear frames 44.

It should be appreciated that while two fasteners 58 are detailed to secure each cover 50 to one of the rear frame rails 44, other embodiments may exist where fewer or more than two fasteners 58 may be used to secure the cover 50. Further, it is contemplated that the fasteners 58 used to secure the cover 50 to the rear frame rails 44 may extend through any of the bores 56 in the fender 34 and any of the holes 46 in the rear frames 44, and should not be limited to just the bores 56 and holes 46 described above. Finally, each cover 50 may include a single piece that wraps around the rear side of the fender 34 in contrast to securing a separate cover 50 to each rear frame rail 44.

Figure 4:
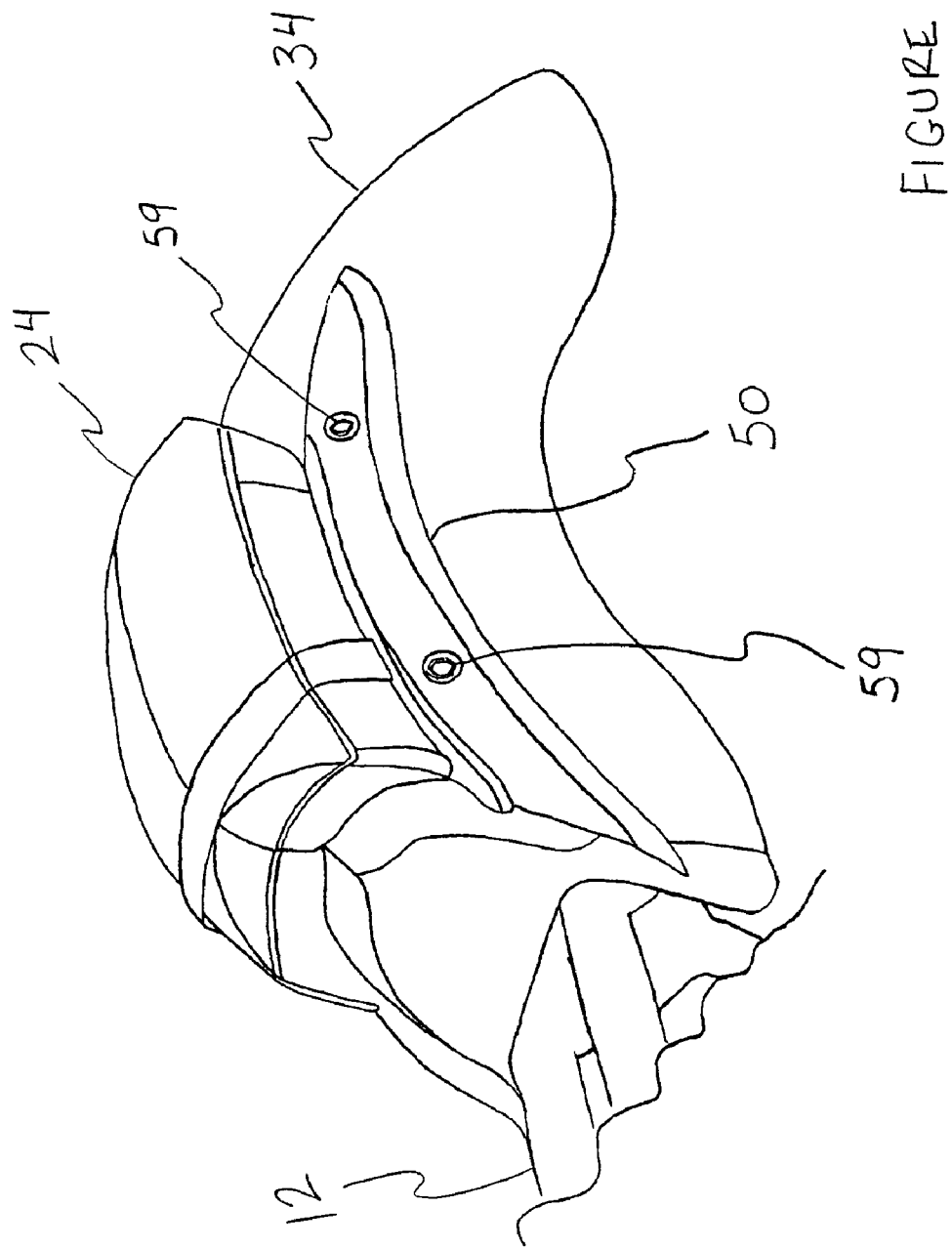
FIG. 4 is a schematic, side perspective view of the upper rear portion of the motorcycle of FIG. 1.

FIG. 4 shows a schematic, side perspective view of the upper rear portion of the motorcycle 10 of FIG. 1. This view shows one embodiment of an assembly using the rear frame rails 44 (not visible) as mounting supports. As such, the frame 12 is shown to be anterior to the rear fender 34, the one component (shown as the rear passenger seat 24), and the covers 50 (only one of which is visible). The only fasteners 58 that are visible are those that secure each of the covers 50 to the rear frame rails 44. Otherwise, the fasteners 58 used to secure the component as well as the rear fender 34 are concealed by the covers 50. Likewise, the bores 56 defined in the rear fender 34 are also covered and thus, concealed by the covers 50.

As far as removing, adding, or replacing the one or more components, an operator would remove the fasteners 58 securing each of the covers 50 to the rear frame rails 44. Subsequently, the operator would have access to remove the fasteners 58 used to secure the one or more components to the rear frame rails. Preferably, all the fasteners 58 utilized in securing each of the fender 34, the one or more components, and the covers 50 to the rear frame rails 44 are threaded bolts having hexnut heads. However, other embodiments may involve using other fastener configurations. One embodiment may involve using two types of fasteners 58, one in securing the fender and another in securing the one or more components and the covers 50. As such, an operator would not be able to mistakenly remove the fender 34 when the intent was to remove the one or more components. Another embodiment may involve using three types of fasteners 58, one used in securing the fender 34, another used in securing the one or more components, and another used in securing the covers 50. In addition, a special non-standard tool could be designed having one, two, or three bits that could be utilized by the operator to remove the three fastener types. Such a tool would help the operator in identifying which fastener types secure which items, and would help prevent tampering by others in the field.

Figure 5:
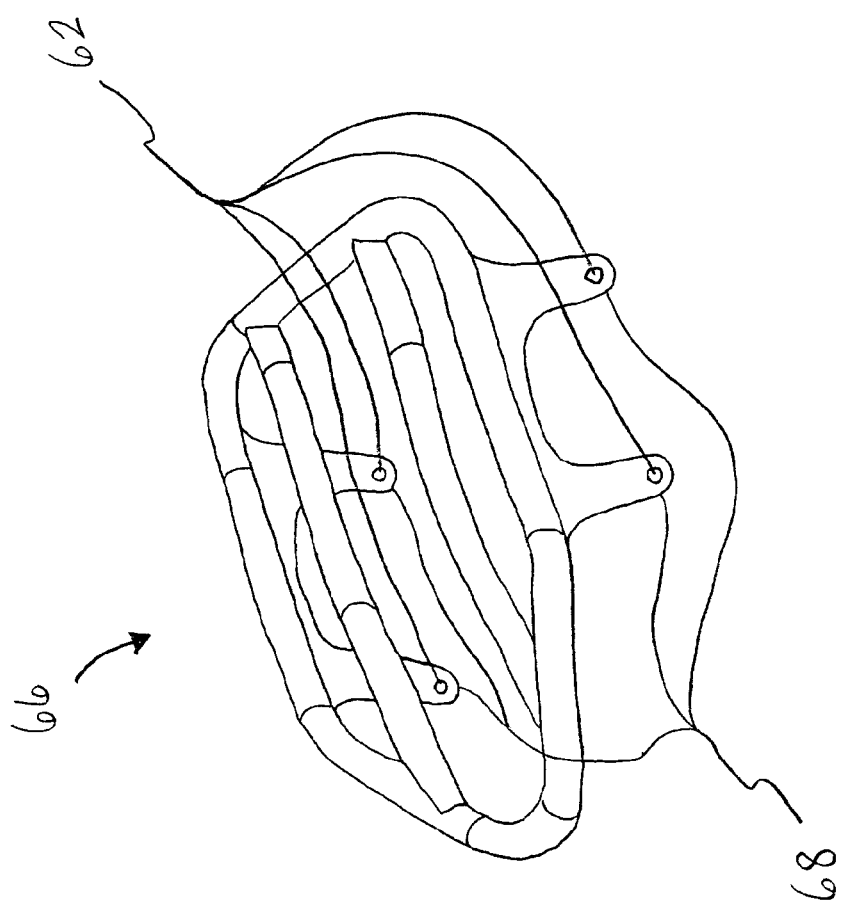
FIG. 5 is a schematic, side perspective view of a luggage rack in accordance with certain embodiments of the invention.
Figure 6:
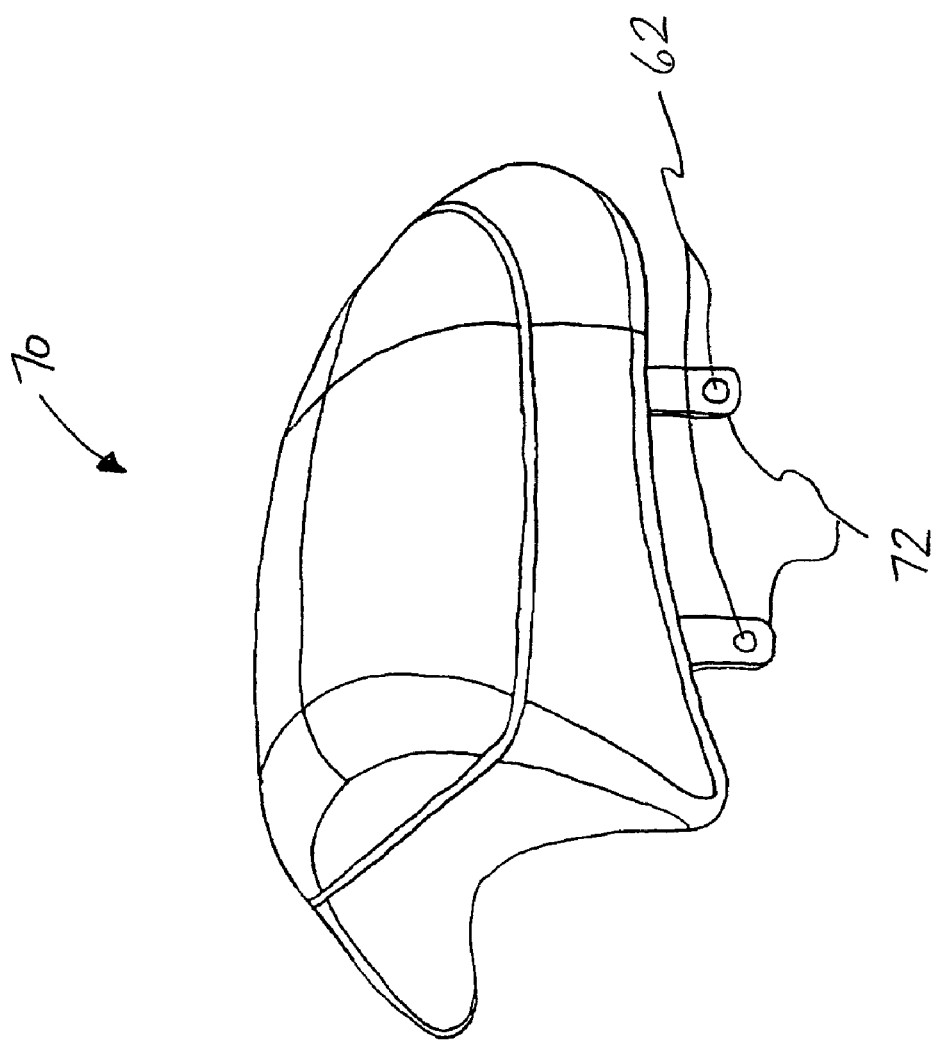
FIG. 6 is a schematic, side perspective view of a smuggler in accordance with certain embodiments of the invention.

FIGS. 5 and 6 illustrate other components that generally mount in the same area on the motorcycle 10 as the rear passenger seat 24. As such, no more than one of these components may generally be included in the same assembly, however, it is contemplated that other designs of these components would allow for mounting them together in the same assembly. These designs would preferably have extended or modified protruding portions 60 to still allow for mounting to the rear frame rails 44, yet to allow for the one of more components not to be located in the same area of the motorcycle 10. FIG. 5 illustrates a schematic, side perspective view of a luggage rack 66 in accordance with certain embodiments of the invention. Similar to the passenger seat 24 described above, the luggage rack 66 includes portions 68 that protrude away from the rack 66, and each of the protruding rack portions 68 contains one aperture 62. However, unlike the passenger seat 24, the protruding portions 68 of the rack are formed integrally with the rack 66. FIG. 6 shows a schematic, side perspective view of a smuggler 70 in accordance with certain embodiments of the invention. The smuggler 70 is a device used for carrying items therein. Similar to the passenger seat 24 described above, the smuggler 70 also includes portions 72 that protrude away from the smuggler 70 (two of the portions 72 on the opposing side of the smuggler 70 are not visible in FIG. 6), and each of the protruding portions 72 contains one aperture 62. Further, each of the portions 72 protrude from a mounting bracket attached to the underside of the accessory.

Figure 7:
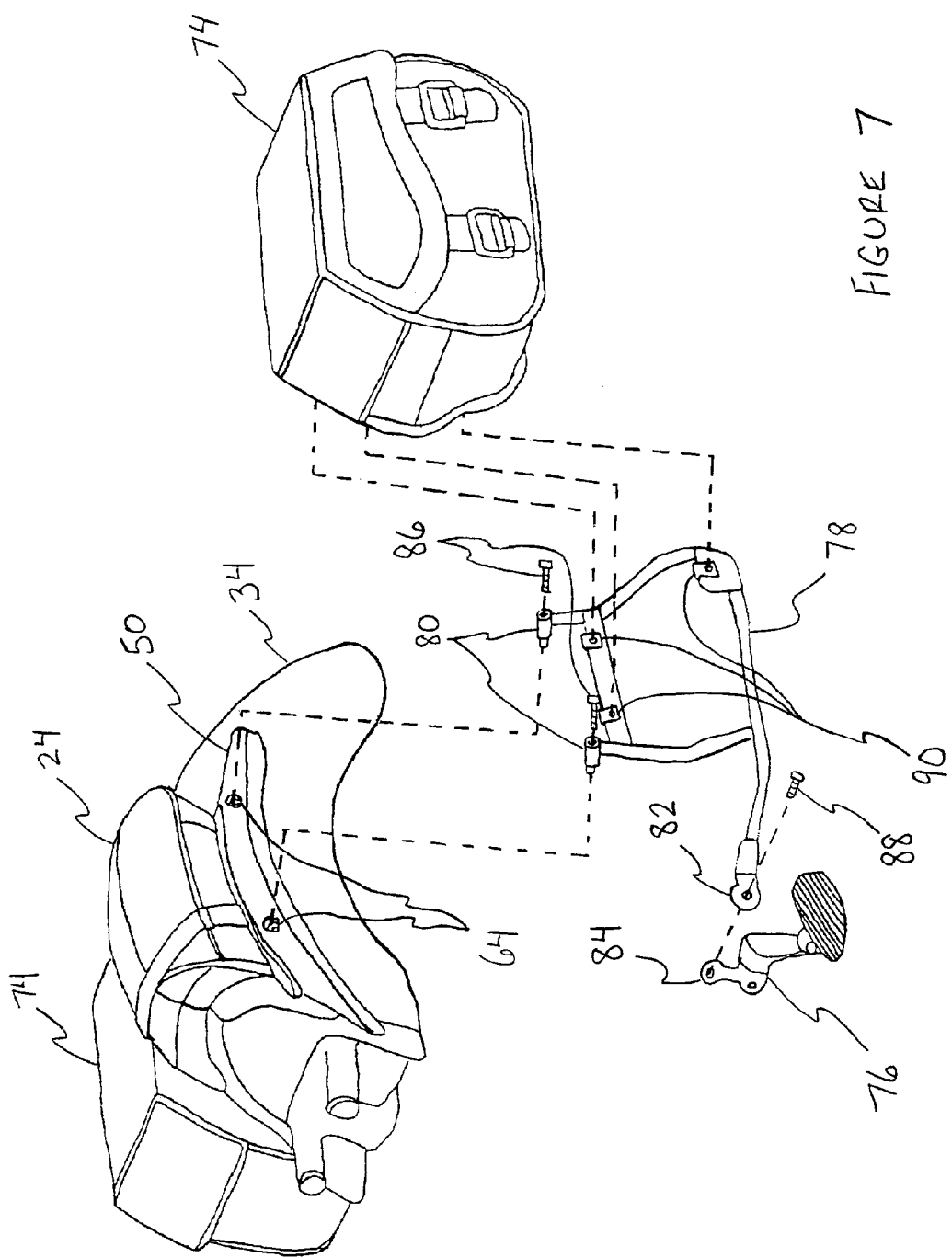
FIG. 7 is a schematic, exploded side perspective view of an upper rear portion of a motorcycle in accordance with certain embodiments of the invention.

FIG. 7 illustrates a schematic, exploded side perspective view of an upper rear portion of a motorcycle 10 in accordance with certain embodiments of the invention. The assembly shows an embodiment of mounting saddlebags 74 to the upper rear portion of the motorcycle 10 as well as to a footrest 76 of the motorcycle 10. As shown, FIG. 7 depicts the mounting of only one saddlebag 74. The mounting includes a support bracket 78 having two bosses 80 configured to align with the openings 64 in the cover 50, and a bracket portion 82 configured to align with a retainer extension 84 protruding from the footrest 76. The support bracket 78 is secured to the rear frame rails 44 (not visible in FIG. 7) using one or more retainers 86. The one or more retainers 86 are each adapted to initially extend through one of the bosses 80 in the support bracket 78, to extend through one of the openings 64 in the cover 50, to further extend through one of the bores 56 (not visible in FIG. 7) in the rear fender 34, and to finally be threadably received in a corresponding aligned hole 46 (not visible in FIG. 7) in one of the frame rails 44. In one embodiment, a quantity of two retainers 86 is utilized to secure each of the support brackets 78 to one of the rear frame rails 44. Preferably, the retainers 86 utilized to secure the brackets 78 replace the fasteners 58 normally used to secure the covers 50 to the rear frames 44. As the retainers 86 must extend through the bosses 80, their length is generally greater than that of the fasteners 58. The support bracket 78 is also secured to the footrest 76 attached to the motorcycle 12 (not visible in FIG. 7) using a coupling 88 that is threadably received by the retainer extension 84. Once each of the support brackets 78 is secured, one of the saddlebags 74 is subsequently attached to an exterior side of each of the support brackets 78. Each support bracket 78 further has one or more fastener clips 90 which function with fasteners (not shown in FIG. 7) to secure the saddlebag 74 to the support bracket 78.

It should be appreciated that while two retainers 82 and one coupling 88 are detailed to secure each support bracket 78, other embodiments may exist in which different quantities of the retainers 82 or the couplings 88 may be used to secure the bracket 78. Additionally, no limitation is intended in using three fastener clips 90 to secure each of the saddlebags 74 to one of the brackets 78. It is contemplated that other embodiments may exist in which other quantities of fastener clips 84 may be appropriate. Finally, it should be appreciated that each of the support brackets 78 may be mounted between the fender 34 and one of the covers 50, with the corresponding saddlebag 74 being mounted to the bracket 78 having the cover 50 located therebetween.

While a preferred embodiment of the present invention has been described, it should be understood that various changes, adaptations, and modifications may be made therein without departing from the spirit of the invention and the scope of the appended claims.

What is claimed is:

1. A motorcycle comprising:
   a frame;
   a front wheel operatively couple to a front portion of the frame;
   a rear wheel operatively coupled to a lower rear portion of the frame;
   an upper rear portion of the frame comprising one or more rear frame rails, each rail having a plurality of holes located therein;
   a rear fender directly coupled to the upper rear portion of the frame, the rear fender including a plurality of bores located therein, each of the plurality of bores configured to align with one of the plurality of holes in one of the rear frame rails; and
   one or more components directly coupled to the upper rear portion of the frame, at least part of the upper rear portion of the frame located interior to the fender and the one or more components, and the one or more components making contact only with the frame and fasteners that couple the one or more components to the frame;
   wherein at least one of the components includes a mounting bracket having one or more protruding portions, with at least one portion having an aperture located therein, each aperture configured to align with one of the plurality of bores in the fender that is aligned with one of the plurality of holes in one of the rear frame rails.

2. The motorcycle of claim 1, wherein the upper rear portion of the frame comprises two rear frame rails.

3. The motorcycle of claim 1, wherein each of the one or more components comprises an accessory to the motorcycle, each of the components and the rear fender adapted to be supported by at least one of the rear frame rails.

4. The motorcycle of claim 1, wherein the one or more components include one or optionally more of a passenger seat, a luggage rack, a smuggler, saddlebags, a driver backrest, covers, and a passenger backrest.

5. The motorcycle of claim 1, wherein each of the fasteners is adapted to couple one of the rear fender and at least one of the one or more components to the upper rear portion of the frame, each of the fasteners adapted to at least extend through one of the plurality of bores in the rear fender and be threadably received in one of the plurality of holes in one of the rear frame rails.

6. The motorcycle of claim 1, wherein at least part of the fender is located interior to the one or more components.

7. The motorcycle of claim 1, wherein one or more of the plurality of holes has a portion formed around an outer perimeter thereof, wherein each portion axially extends a certain distance from the rear frame rail, and wherein each portion is configured to enable the one or more components to make contact only with the frame and fasteners coupling the one or more components to the frame.

8. A motorcycle comprising:
a frame;
a front wheel operatively couple to a front portion of the frame;
a rear wheel operatively coupled to a lower rear portion of the frame;
an upper rear portion of the frame comprising one or more rear frame rails, each rail having a plurality of holes located therein;
a rear fender directly coupled to the upper rear portion of the frame, the rear fender including a plurality of bores located therein, each of the plurality of bores configured to align with one of the plurality of holes in one of the rear frame rails;
one or more components directly coupled to the upper rear portion of the frame, at least part of the upper rear portion of the frame located interior to the fender and the one or more components, and the one or more components making contact only with the frame and fasteners that couple the one or more components to the frame; and
one or more covers each directly coupled to the upper rear portion of the frame, the one or more covers adapted to mask the plurality of bores in the fender;
wherein each of the one or more covers has one or more openings each configured to align with one of the plurality of bores in the fender that is aligned with one of the plurality of holes in one of the rear frame rails.

9. The motorcycle of claim 8, further comprising one or more support brackets each coupled to the upper rear portion of the frame, each bracket including at least one boss configured to align with at least one of the openings in one of the covers that is aligned with one of the plurality of bores in the fender that is aligned with one of the plurality of holes in one of the rear frame rails.

10. The motorcycle of claim 9, wherein each of the one or more support brackets is coupled to a saddlebag.

11. The motorcycle of claim 9, wherein each of the one or more support brackets is coupled to a footrest.

12. A rear fender mounting assembly comprising:
a frame having a front and a rear portion, the rear portion including an upper portion and a lower portion, the upper rear portion including one or more rear frame rails, each rail having a plurality of holes located therein, one or more of the plurality of holes having a portion formed around an outer perimeter thereof, and each portion axially extending outward a certain distance from the rear frame rail; and
a rear fender directly coupled to the upper rear portion of the frame, the rear fender including a plurality of bores located therein, each of the plurality of bores aligning with one of the plurality of holes in one of the rear fame rails, the one or more portions extending through the corresponding bores so as to create a space between the rear fender and one or more components mounted to such portions.

13. The assembly of claim 12, wherein at least part of the upper rear portion of the frame is located interior to the rear fender.

14. The assembly of claim 12, wherein the one or more components are each directly coupled to the upper rear portion of the frame.

15. The assembly of claim 14, wherein each of the one or more components has one or more apertures each configured to align with one of the plurality of bores in the fender that is aligned with one of the plurality of holes in one of the rear frame rails, and the only contact between the one or more components and the rear frame rails is at the portions of the corresponding holes.

16. The assembly of claim 12, further comprising one or more covers each directly coupled to the upper rear portion of the frame, the one or more covers adapted to mask the plurality of bores in the fender.

17. The assembly of claim 16, wherein each of the one or more covers has one or more apertures each configured to align with one of the plurality of bores in the fender that is aligned with one of the plurality of holes in one of the rear fame rails.

18. The assembly of claim 12, further comprising a plurality of fasteners adapted to couple the rear fender to the upper rear portion of the frame, each of the plurality of fasteners adapted to extend through the plurality of bores in the fender and be threadably received in the plurality of holes in one of the rear frame rails.

* * * * *